US007513576B2

(12) United States Patent
Hilberer

(10) Patent No.: US 7,513,576 B2
(45) Date of Patent: Apr. 7, 2009

(54) AIR TREATMENT SYSTEM AND METHOD FOR SECURELY RELEASING A PARKING BRAKE SYSTEM

(75) Inventor: Eduard Hilberer, Hockenheim (DE)

(73) Assignee: Knorr-Bremse Systeme fuer Nutzfahrzeuge GmbH, Munich (DE)

(*) Notice: Subject to any disclaimer, the term of this patent is extended or adjusted under 35 U.S.C. 154(b) by 0 days.

(21) Appl. No.: 11/372,168

(22) Filed: Mar. 10, 2006

(65) Prior Publication Data

US 2006/0244305 A1 Nov. 2, 2006

Related U.S. Application Data

(63) Continuation of application No. PCT/EP2004/010002, filed on Sep. 8, 2004.

(30) Foreign Application Priority Data

Sep. 10, 2003 (DE) ................................ 103 41 723

(51) Int. Cl.
*B60T 13/00* (2006.01)

(52) U.S. Cl. ....................... 303/6.01; 303/8; 303/118.1; 180/273

(58) Field of Classification Search ................... 303/89, 303/3, 7, 8, 15, 6.01, 6.1, 68, 69, 19, 67, 303/118.1; 180/272, 273
See application file for complete search history.

(56) References Cited

U.S. PATENT DOCUMENTS 4,824,178 A 4/1989 Petersen
5,706,909 A 1/1998 Bevins et al.
5,939,795 A 8/1999 Yu
6,089,831 A * 7/2000 Bruehmann et al. .......... 417/282
6,540,308 B1 * 4/2003 Hilberer .................... 303/6.01
6,758,298 B2 * 7/2004 Eberling et al. ............. 180/272
2003/0006644 A1 1/2003 MacGregor et al.
2004/0195910 A1 * 10/2004 Aumuller et al. .............. 303/15
2005/0017474 A1 * 1/2005 Heer ..................... 280/124.16

FOREIGN PATENT DOCUMENTS

DE 0 111778 A1 * 6/1984

(Continued)

OTHER PUBLICATIONS

International Search Report dated Feb. 16, 2005, Including English Translation pp. 1-6.

*Primary Examiner*—Robert A Siconolfi
*Assistant Examiner*—Mariano Sy
(74) *Attorney, Agent, or Firm*—Crowell & Moring LLP

(57) ABSTRACT

An air treatment system and method are provided for supplying a brake system of a utility vehicle with compressed air. The air treatment system includes a compressed air outlet that is used for feeding a parking brake system, more specifically for ventilating at least one spring-loaded cylinder of a parking brake and thus for releasing the parking brake. An electrically actuated valve, by which the compressed air outlet can be prevented from being supplied with compressed air, is provided, along with an indicator that can be electrically evaluated to determine if a person is present for driving the vehicle. The electrically actuated valve prevents the compressed air outlet from being supplied with compressed air when the indicator is not provided.

22 Claims, 4 Drawing Sheets

FOREIGN PATENT DOCUMENTS

| | | | | |
|---|---|---|---|---|
| DE | 35 27 907 | A1 | | 2/1987 |
| DE | 43 27 759 | A1 | | 3/1995 |
| DE | 0 831383 | A1 | * | 3/1998 |
| DE | 102 16 547 | A1 | | 10/2002 |
| DE | 202 13 915 | U1 | | 3/2003 |
| DE | 102 46 799 | A1 | | 4/2004 |
| EP | 0 638 716 | A1 | | 2/1995 |
| EP | 1 063 453 | A1 | | 12/2000 |
| WO | WO 03/008250 | A2 | | 1/2003 |

* cited by examiner

AIR TREATMENT SYSTEM AND METHOD FOR SECURELY RELEASING A PARKING BRAKE SYSTEM

CROSS-REFERENCE TO RELATED APPLICATIONS

This application is a continuation of PCT Application No. PCT/EP2004/010002 filed on Sep. 8, 2004, which claims priority to German Application No. 103 41 723.0 filed Sep. 10, 2003, the disclosures of which are incorporated by reference herein.

BACKGROUND AND SUMMARY OF THE INVENTION

The invention relates to an air treatment system for supplying a commercial vehicle brake system with compressed air. The system includes a compressed air outlet which is provided for supplying a parking brake system and which is intended for ventilating at least one spring-loaded cylinder of a parking brake, and thus consequently for releasing the parking brake.

The invention relates, furthermore, to a method for ventilating at least one spring-loaded cylinder of a parking brake and thus for releasing the parking brake of a commercial vehicle brake system which is supplied with compressed air by an air treatment system. The air treatment system has a compressed air outlet provided for supplying the parking brake system.

Generic air treatment systems fulfill numerous functions regarding the supply of compressed air to a commercial vehicle. The air treatment systems serve, inter alia, for supplying the brake system of a commercial vehicle with compressed air. In particular, compressed air reservoirs are filled with air via air treatment systems, in order thereby to make a stock or supply of compressed air available for the various brake circuits. In a commercial vehicle with two brake circuits for the service brake system, it is necessary to provide a compressed air reservoir for each of these brake circuits. In general, there is a third compressed air reservoir, which provides a stock of compressed air for the trailer brake system ("circuit 3").

The parking brake system of commercial vehicles also operates with compressed air. In order for the vehicle to be kept stationary, with the engine switched off and therefore with the compressor switched off, spring-loaded cylinders are provided in the parking brake system, which make the required parking brake action available by means of a spring force. To release the parking brakes, the spring-loaded cylinders are ventilated, so that the spring force is counteracted, with the result that the parking brakes can be released. In order to induce such a release of the parking brake system, it is therefore necessary for compressed air to be present at the respective outlet of the air treatment system, and, furthermore, that a handbrake valve, which is generally provided between the spring-loaded cylinders and the compressed air outlet, is brought into the release position.

The operation of a vehicle with a parking brake system of this type presents no problems when the handbrake valve is released at a pressure which is sufficient to release the parking brake. If, however, there is no pressure or only a low pressure present at the compressed air outlet for the parking brake system, then the opening of the handbrake valve may initially not bring about a release of the parking brake system. If a sufficient pressure for releasing the parking brake system is then built up later, this release takes place at a time interval uncorrelated with the opening of the handbrake valve. This entails risks. If, for example, the driver warms up the engine on cold winter days, opens the handbrake valve and then leaves the vehicle in order to remove ice from the vehicle windows, then compressed air is in time built up. When there is sufficient compressed air, therefore, the spring-loaded cylinders are ventilated, and an unintentional and unexpected release of the parking brake system occurs. The vehicle may thus be inadvertently set in motion.

The object on which the invention is based is to overcome the problems of the prior art and, in particular, to avoid the risk of unintentional release of the parking brake system.

The invention builds on the generic air treatment system in that an electrically actuable valve is provided, by which a supply of the compressed air to the compressed air outlet can be prevented, in that, when a person for driving the commercial vehicle is present, an electrically evaluatable indicator can be made available, and in that the electrically actuable valve prevents the supply of the compressed air outlet with compressed air when the indicator is absent. This ensures that an unintentional ventilation of the spring-loaded cylinders of the parking brake system cannot occur. Instead, a ventilation of the spring-loaded cylinders can take place only when a person for driving the commercial vehicle is present and, consequently, an electrically evaluatable indicator is made available. If this indicator is absent, an electrically actuable valve is induced to shut off the supply of compressed air to the compressed air outlet of the parking brake system. Furthermore, the lack of a third reservoir ensures that an unintentional ventilation of the spring-loaded cylinders is also avoided in this way.

Beneficially, there is provision for the compressed air outlet to be supplied with compressed air via an overflow valve and for the electrically actuable valve to be a solenoid valve which shuts off the overflow valve in at least one switching state. The solenoid valve can be activated in a simple way and as a function of the presence of an electrically evaluatable indicator. The overflow valve can be shut off, depending on the switching state of the solenoid valve.

The invention is developed especially advantageously in that the solenoid valve is a 3/2-way valve which, in a first switching state, ventilates a control inlet of the overflow valve and, in a second switching state, acts with pressure upon the control inlet of the overflow valve, with the result that the overflow valve is shut off. The compressed air supply is connected to one connection of the solenoid valve, and the control inlet of the overflow valve is connected to another connection of the solenoid valve. Furthermore, an outlet is available for ventilation. Thus, in one switching state of the 3/2-way valve in which the compressed air inlet is connected to the compressed air outlet, with compressed air present at the inlet the control inlet of the overflow valve is acted upon by pressure. In the other switching state, that connection of the 3/2-way valve which is connected to the control inlet of the overflow valve is connected to the ventilating outlet, so that the control inlet can thereby be ventilated. In addition to the direct activation of the overflow valve by the solenoid valve preferably being designed as a 3/2-way valve, it is also contemplated to use a solenoid valve for the pneumatic activation of a pilot control valve and, thereby, to implement the respective switching states.

It is preferable that the second switching state of the 3/2-way solenoid valve is brought about by the application of current to the 3/2-way solenoid valve. Since it is only ever necessary to shut off the overflow valve for a short time during the build-up of compressed air in the compressed air system of the commercial vehicle, the switching logics addressed ensure as short a current application time of the solenoid valve as possible.

In one embodiment, there may be provision for the solenoid valve to be supplied centrally with compressed air. In this case, the overflow valve can be shut off whenever the compressor delivers pressure.

It may also be beneficial, however, that the solenoid valve is supplied with compressed air by at least one service brake circuit. In this case, the reservoirs of the service brake system can make the required control pressure available for the overflow valve.

In the air treatment system according to the invention, there is beneficially provision for the compressed air outlet to be connected to the at least one spring-loaded cylinder via a handbrake valve. There are, therefore, at least two necessary conditions for the ventilation of a spring-loaded cylinder, to be precise, first, an open handbrake valve and, second, an overflow valve which is not shut off.

It is preferable that the electrically evaluatable indicator is made available as a result of the actuation of a pedal in the driver's cab of the commercial vehicle. The tapping of the accelerator pedal, of the brake pedal, or of the clutch pedal may be considered as an example of this. This involves the generation of reliable indicators, since such tapping of the pedal assembly is possible only when a person is present in the driver's cab of the commercial vehicle.

It may likewise be expedient that the electrically evaluatable indicator is made available as a result of the fastening of a safety belt in the driver's cab of the commercial vehicle. A fastened safety belt, too, is generally a reliable criterion for the presence of a person.

The air treatment system according to the invention is advantageously developed in that the electrically evaluatable indicator can be supplied directly or indirectly to an electrical control via a data bus, and in that the electrically actuable valve can be actuated by the electrical control. The electrical signal generated, for example, by the tapping of a pedal can be made available, for example, to a vehicle management computer, which then transfers an electrical signal transmission to the electrical control of the air treatment system via a central plug. The solenoid valve directly activatable by the air treatment system may then be activated as a function of the presence of the indicator.

Furthermore, there is advantageously provision for a signal device to be provided in the driver's cab of the commercial vehicle. The signal device indicates that a minimum pressure for operating the service brake system is overshot, and for the compressed air outlet to be supplied with compressed air in the event of the overshooting of the minimum pressure and with the indicator present. As soon as there is sufficient pressure in the service brake system, there is nothing more to prevent a ventilation of the spring-loaded cylinders, as long as there is a person in the driver's cab of the commercial vehicle; the latter is ensured by a check of the presence of the indicator.

In this respect, it is especially beneficial that the signal device used is a light which conventionally indicates the detention of the vehicle by means of the parking brake system, that the light flashes when the minimum pressure is overshot and the parking brake is locked, and that the light is extinguished when a pressure threshold in the spring-loaded cylinder is overshot. The normal sequence for starting a commercial vehicle equipped with the air treatment system according to the invention will, therefore, be that the driver switches on the ignition and thus induces a pressure build-up in the air treatment system. At this point in time, the parking brake system is still ventilated, so that the vehicle is detained. The lamp for the parking brake system lights up in the usual way. Pressure will subsequently build-up in the air treatment system, and a minimum pressure for operating the service brake system is overshot. At this point in time, the lamp begins to flash, so that the driver is advised that he can release the parking brake system. For this purpose, the driver opens the handbrake valve, if this has not already been done at an earlier point in time, and makes the electrically evaluatable indicator available, for example by tapping the brake pedal or by fastening a safety belt or by the fact that the safety belt is already fastened. As soon as a pressure threshold is overshot in the spring-loaded cylinders, the light is extinguished completely, thus indicating that the parking brakes are released.

The invention builds on the generic method in that an electrically actuable valve is provided, by which a supply of the compressed air outlet with compressed air can be prevented, in that, when a person for driving the commercial vehicle is present, an electrically evaluatable indicator may be made available, and in that the electrically actuable valve prevents the supply of the compressed air outlet with compressed air when the indicator is absent. In this way, the advantages and special features of the air treatment system according to the invention are also implemented within the framework of a method. This also applies to the especially preferred embodiments of the method according to the invention, which are given below.

There is beneficially provision for the compressed air outlet to be supplied with compressed air via an overflow valve and for the electrically actuable valve to be a solenoid valve which shuts off the overflow valve in at least one switching state.

The method according to the invention is particularly advantageously developed in that the solenoid valve is a 3/2-way valve which, in a first switching state, ventilates a control inlet of the overflow valve and, in a second switching state, acts with pressure upon the control inlet of the overflow valve, with the result that the overflow valve is shut off.

It is preferable that the second switching state of the 3/2-way solenoid valve is brought about by the application of current to the 3/2-way solenoid valve.

In one embodiment of the method according to the invention, there may be provision for the solenoid valve to be supplied centrally with compressed air.

It may also be beneficial, however, that the solenoid valve is supplied with compressed air by at least one service brake circuit.

In the method according to the invention, there is beneficially provision for the electrically evaluatable indicator to be made available as a result of the actuation of a pedal in the driver's cab of the commercial vehicle.

It is preferable that the electrically evaluatable indicator is made available as a result of the fastening of a safety belt in the driver's cab of the commercial vehicle.

It may likewise be expedient that the electrically evaluatable indicator is supplied directly or indirectly to an electrical control via a data bus, and that the electrically actuable valve is actuated by the electrical control.

The method according to the invention is advantageously developed in that a signal device is provided in the driver's cab of the commercial vehicle. The signal device indicates that a minimum pressure for operating the service brake system is overshot, and in that the compressed air outlet to be supplied with compressed air in the event of the overshooting of the minimum pressure and with the indicator present.

Furthermore, there is advantageously provision for the signal device used to be a light, which conventionally indicates the detention of the vehicle by means of the parking brake system, for the light to flash when the minimum pressure is overshot and the parking brake is locked, and for the light to be extinguished when a pressure threshold in the spring-loaded cylinder is overshot.

The invention relates, furthermore, to a commercial vehicle having an air treatment system according to the invention.

Advantageous embodiments of the invention are described and claimed herein.

The invention is based on the recognition that, as a result of the requirement for an electrically evaluatable indicator as a precondition for the ventilation of the spring-loaded cylinders of the parking brake system, additional security in the release of the parking brake system is made available. Thus, within the scope of the invention, there may be the requirement that a driver is present in the driver's cab of the commercial vehicle in order to permit the ventilation of the spring-loaded cylinders.

Other objects, advantages and novel features of the present invention will become apparent from the following detailed description of the invention when considered in conjunction with the accompanying drawings.

DETAILED DESCRIPTION OF THE DRAWINGS

In the following description of the drawings, identical reference symbols designate identical or comparable components.

Figure 1:
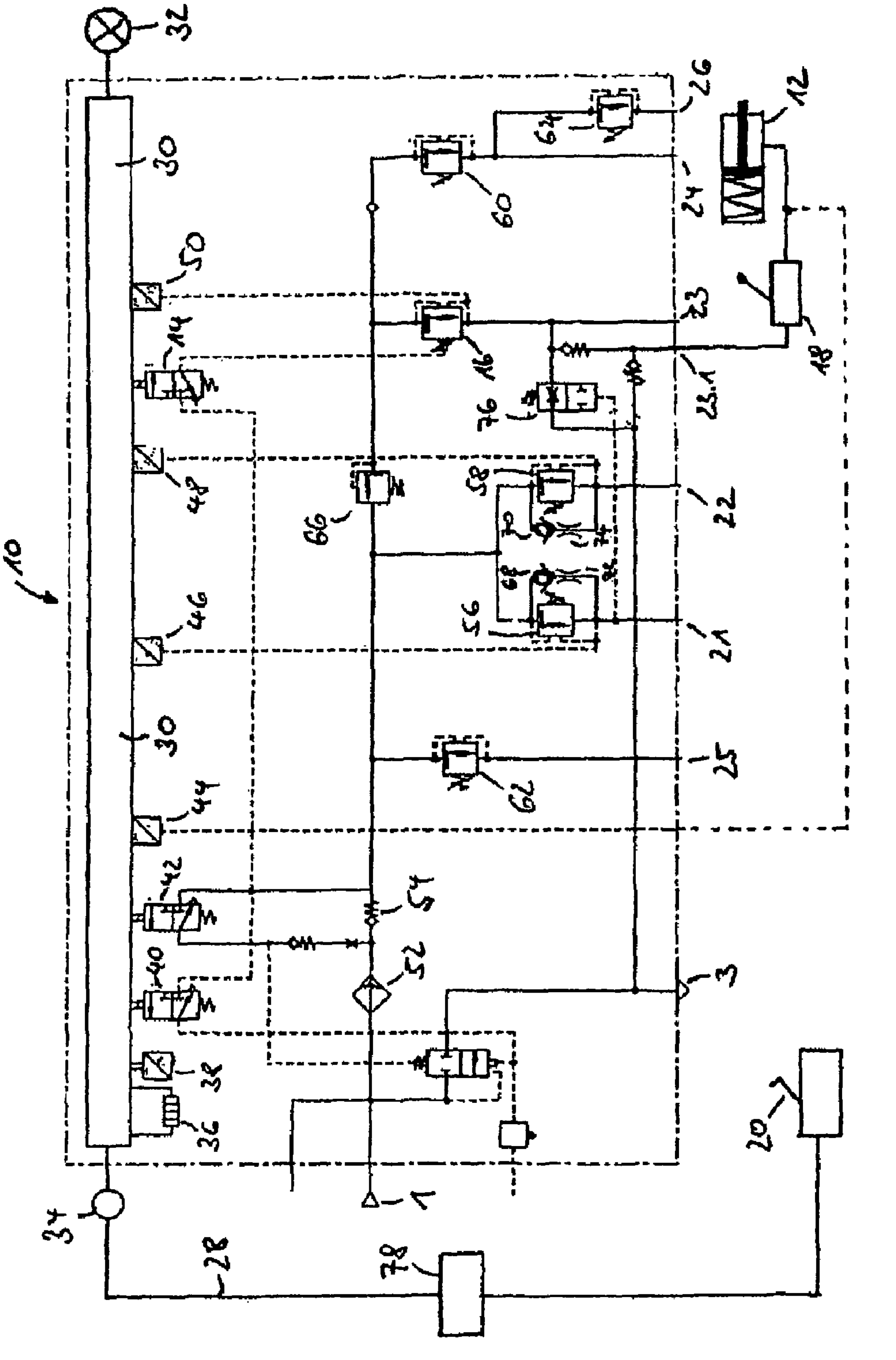
FIG. 1 shows a circuit diagram of a first embodiment of an air treatment system according to the invention.

FIG. 1 shows a circuit diagram of a first embodiment of an air treatment system according to the invention. The air treatment system 10 is equipped with a central plug 34. Via this central plug 34, the electrical control 30 of the air treatment system 10 can be connected, for example, to a CAN bus 28.

Within the air treatment system 10, the following components are connected to the electrical control 30: a heater 36, a temperature sensor 38, a solenoid valve 40 for pressure regulator control, a solenoid valve 42 for regeneration control, a plurality of pressure sensors 44, 46, 48, 50 and a 3/2-way solenoid valve 14 which valve, as explained further below, is provided for shutting off the supply of compressed air to the compressed air outlet 23.1 according to the invention.

Outside the air treatment system 10, a light 32 is provided, which is likewise connected to the electrical control 30 of the air treatment system 10, and in this case this connection may also take place directly or indirectly via a data bus.

The air treatment system 10 is equipped, furthermore, with a filling inlet 1, so that a filling via a drier cartridge 52 and a pressure regulator non-return valve 54 can take place. To supply the various pressure consumer circuits, the compressed air outlets 21, 22, 23, 23.1, 24, 25, 26 are supplied with compressed air via overflow valves 56, 58, 16, 60, 62, 64. The overflow valves 16, 60, 64 are additionally, in this case, preceded by a pressure limitation valve 66. The overflow valves 56, 58 are provided for supplying the compressed air outlets 21, 22 for the service brake system circuits. Non-return valves 68, 70 and throttles 72, 74 are connected in parallel to these overflow valves 56, 58. The non-return valves 68, 70 make it possible to bypass the overflow valves 56, 58 in a direction away from the compressed air outlets 21, 22. An additional supply of the trailer brake system arranged at the compressed air outlet 23 is thereby possible. This additional supply is made available, since no separate reservoir for the storage of compressed air specially for the trailer brake system is connected to the compressed air outlet 23. The omission of such a reservoir is important for the functioning according to the invention of the air treatment system, as is also explained further below. Moreover, a valve 76 is provided, which, in one switching state, permits a throttled outflow of compressed air from the trailer brake system to the discharge 3, while, in its other switching state, it prevents the outflow of compressed air from the trailer brake system as a function of the pressure in one of the service brake circuits, here at the compressed air outlet 21.

The air treatment system 10 illustrated contains further components which, however, are less important for understanding the invention. These components are therefore not described.

A handbrake valve 18 is connected to the compressed air outlet 23.1 of the air treatment system 10. Furthermore, a spring-loaded cylinder 12 can be supplied with compressed air via this handbrake valve 18. A pressure measurement connection between the spring-loaded cylinder 12 and the pressure sensor 44 is, furthermore, provided.

The CAN bus 28 is electrically connected via an electronic control 78, which, for example, may be an integral part of a vehicle management computer, to a pedal 20, for example a brake pedal, a clutch pedal or an accelerator pedal, of the commercial vehicle.

The compressed air treatment system according to the invention operates, in terms of the release of the parking brake system, as follows. After the ignition has been switched on and the compressor has correspondingly been put into operation, compressed air is present at the compressed air inlet 1. Consequently, pressure can be built-up in the air treatment system 10 and can be supplied to the individual consumers when the opening pressures of the individual overflow valves 56, 58, 16, 60, 62, 64 are overshot. There is, however, a special feature with regard to the overflow valve 16, which serves for supplying the trailer brake system via the compressed air outlet 23 and for supplying the parking brake system via the compressed air outlet 23.1. To be precise, immediately after the ignition has been switched on, current is applied to the solenoid valve 14, so that compressed air is supplied to the control inlet of the overflow valve 16. The overflow valve consequently shuts off an overflow of compressed air to the compressed air outlets 23 and 23.1. If, then, the handbrake valve 18 is opened, then, because the overflow valve 16 is shut off, no supply of compressed air to the spring-loaded cylinder 12 via the compressed air outlet 23.1 takes place. In particular, also, no reservoir for the trailer brake system is connected to the compressed air outlet 23, so that there is also no corresponding stock of compressed air from which compressed air could be extracted. The parking brake system thus detains the vehicle reliably, this being indicated by the continuous lighting of the light 32 activated by the electrical control 30, as long as the pressure in the service brake circuits connected to the compressed air outlets 21, 22 lies below a minimum pressure for operating the service brake system. However, if this pressure overshoots the minimum pressure, the light 32 begins to flash. This indicates that it is in then possible, in principle, to release the parking brake system. If the handbrake valve 18 is already in the opened state, the release of the parking brake system takes place in that the driver taps the pedal 20, with the result that he transfers an indicator of his presence to the electrical control 30. If the handbrake valve 18 is not yet opened when the light 32 begins to flash, the driver can open the handbrake valve 18 at this point in time and simultaneously, or with a time delay, tap the pedal 20 in order to provide the indicator. Basically, other electrical signal generators for providing the indicator may also be envisaged, for example an indicator which indicates a closed safety belt.

The pressure in the spring-loaded cylinder 12 is measured by the pressure sensor 44. As soon as this pressure overshoots a specific pressure threshold, the electrical control 30 causes the light 32 to be extinguished completely. At this point in time, the driver may assume that the parking brake system is released.

Figure 2:
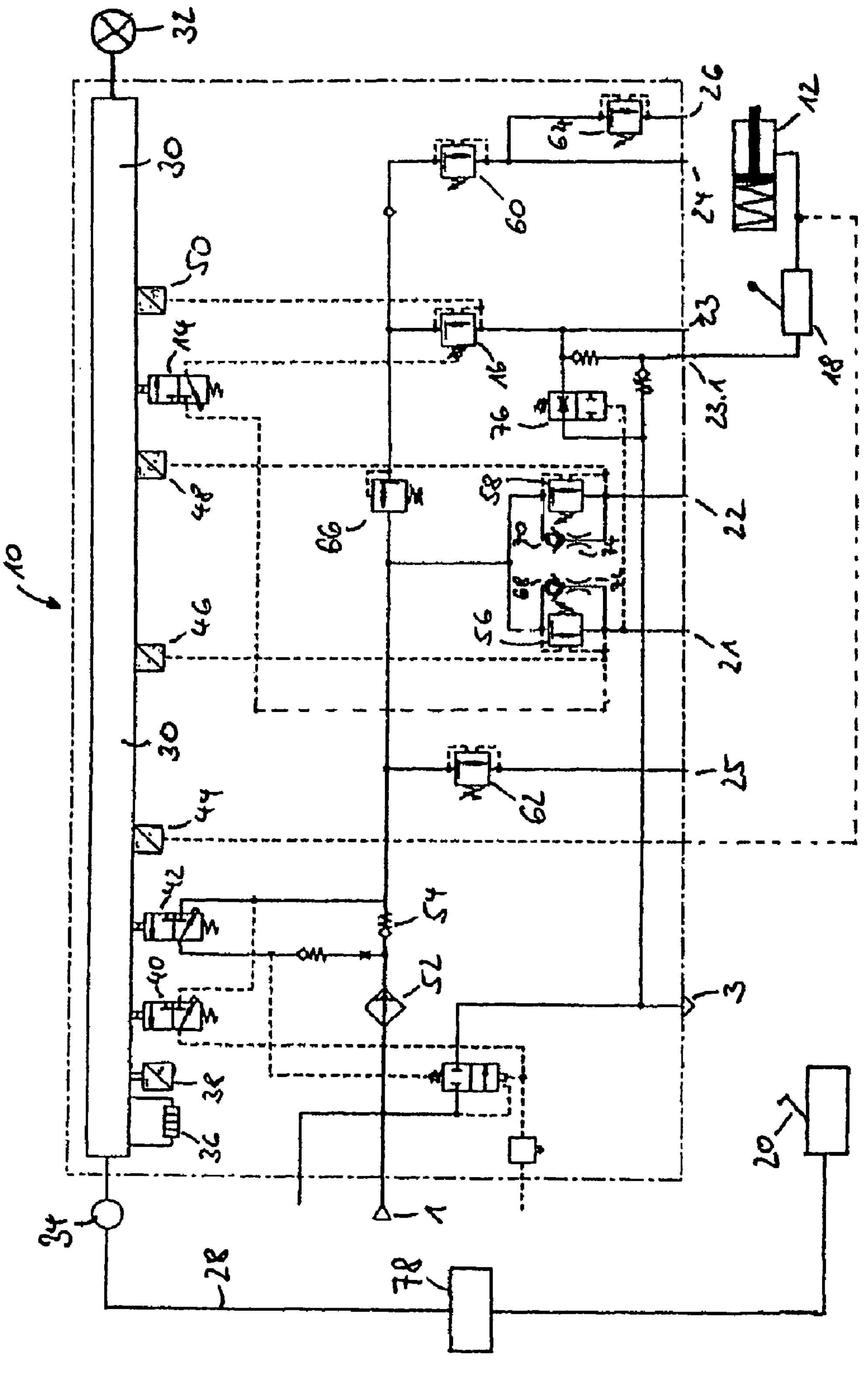
FIG. 2 shows a circuit diagram of a second embodiment of an air treatment system according to the invention.

FIG. 2 shows a circuit diagram of a second embodiment of an air treatment system according to the invention. Here, in contrast to FIG. 1, the compressed air inlet of the solenoid valve 14 is not supplied centrally, but rather from the circuit 1 of the service brake system.

Figure 3:
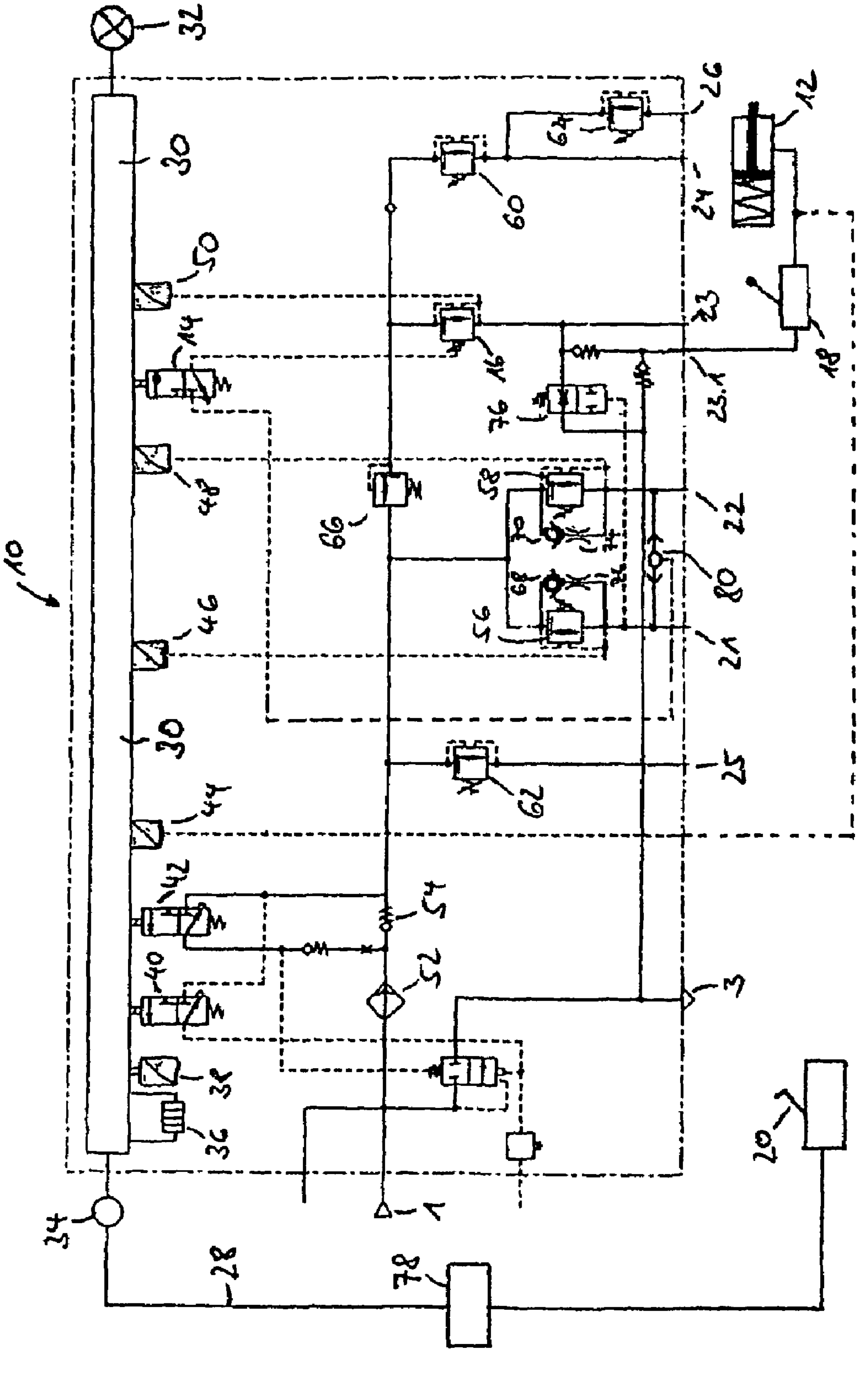
FIG. 3 shows a circuit diagram of a third embodiment of an air treatment system according to the invention.

FIG. 3 shows a circuit diagram of a third embodiment of an air treatment system according to the invention. Here, too, in contrast to FIG. 1, the compressed air inlet of the solenoid valve 14 is not supplied centrally, but rather via a shuttle valve 80, which is connected to circuit 1 and circuit 2 of the service brake system.

Figure 4:
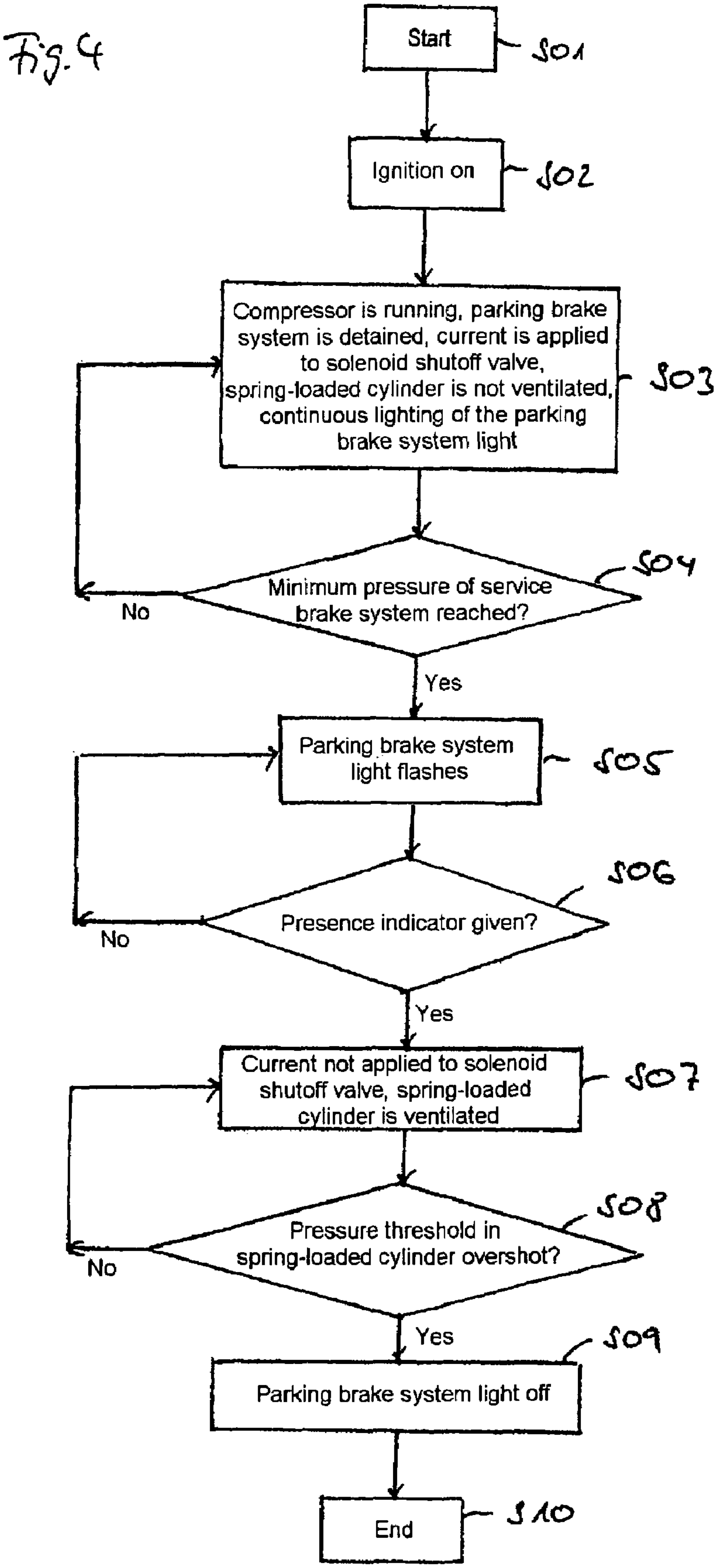
FIG. 4 shows a flowchart for explaining a method according to the invention.

FIG. 4 is a flowchart explaining the method according to the invention. After the start of the illustrated functional sequence in step S01, the ignition is switched on in step S02. Thereupon, in a normal operating sequence, the compressor will run according to step S03, and the parking brake system is detained. According to the invention, in this operating state, current is applied to the solenoid shutoff valve 14, so that the spring-loaded cylinder 12, illustrated in FIGS. 1 to 3 by way of example for the parking brake system, is not ventilated. The parking brake system light 32 lights up permanently. In step S04, then, a check is made as to whether the service brake system has reached its minimum pressure. If this is not so, there is no change to the state features specified in step S03. The sequence therefore returns to step S03. If, however, the minimum pressure of the service brake system is reached, the parking brake system light 32 flashes according to step S05. In step S06, then, a check is made as to whether there is a presence indicator, which may be the case, for example, on account of the touching of a pedal 20. If there is no presence indicator, the parking brake system light 32 continues to flash and the method sequence therefore returns to step S05. If, however, it is established in step S06 that there is the presence indicator, the sequence proceeds to step S07, according to which current is no longer applied to the solenoid shutoff valve 14 and the spring-loaded cylinder 12 is ventilated. Thereafter, in step S08, a check is made as to whether a pressure threshold in the spring-loaded cylinder is overshot. If this is not so, the sequence returns to step S07. Pressure therefore continues to be built-up in the spring-loaded cylinder 12. If, however, the pressure threshold in the spring-loaded cylinder is overshot, the parking brake system light 32 is extinguished according to step S09. Since the parking brake system is then released, the sequence comes to an end in step S10.

The features of the invention which are disclosed in the above description, in the drawings and in the claims may be essential for implementing the invention either individually or in any desired combination.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

TABLE OF REFERENCE SYMBOLS

1 Compressed air inlet
3 Discharge
10 Air treatment system
12 Spring-loaded cylinder
14 Solenoid valve
16 Overflow valve
18 Handbrake valve
20 Pedal
21 Compressed air outlet
22 Compressed air outlet
23 Compressed air outlet
23.1 Compressed air outlet
24 Compressed air outlet
25 Compressed air outlet
26 Compressed air outlet
28 CAN bus
30 Electrical control
32 Light
34 Central plug
36 Heater
38 Temperature sensor
40 Solenoid valve for pressure regulator control
42 Solenoid valve for regeneration control
44 Pressure sensor
46 Pressure sensor
48 Pressure sensor
50 Pressure sensor
52 Drier cartridge
54 Pressure regulator non-return valve
56 Overflow valve
58 Overflow valve
60 Overflow valve
62 Overflow valve
64 Overflow valve
66 Pressure limitation valve
68 Non-return valve
70 Non-return valve
72 Throttle
74 Throttle
76 Valve
78 Electrical control
80 Shuttle valve

What is claimed is:

1. An air treatment system for supplying a commercial vehicle brake system with compressed air, having a compressed air outlet operatively configured to supply compressed air to a parking brake system and to ventilate at least one spring-loaded cylinder of a parking brake of the parking brake system in order to release the parking brake, the system comprising:

an overflow valve through which the compressed air is supplied to the compressed air outlet;

an electrically actuable solenoid valve operatively configured to shut-off the overflow valve in at least one switching state;

an electrically evaluatable indicator signal, which signal is indicative of a presence of a driver of the commercial vehicle; and wherein, when the electrically evaluatable indicator signal is absent, the electrically actuable solenoid valve is in the at least one switching state that shuts-off the overflow valve in order to prevent the compressed air from being supplied to the compressed air outlet.

2. The air treatment system as claimed in claim 1, wherein the solenoid valve is a 3/2-way valve which, in a first switching state, ventilates a control inlet of the overflow valve and, in a second switching state, acts with pressure upon the control inlet of the overflow valve, whereby the overflow valve is shut off.

3. The air treatment system as claimed in claim 2, wherein the second switching state of the 3/2-way solenoid valve is brought about by application of a current to the 3/2-way solenoid valve.

4. The air treatment system as claimed in claim 1, wherein the solenoid valve is supplied centrally with compressed air.

5. The air treatment system as claimed in claim 1, wherein the solenoid valve is supplied with compressed air by at least one service brake circuit.

6. The air treatment system as claimed in claim 1, wherein the compressed air outlet is connected to the at least one spring-loaded cylinder via a handbrake valve.

7. The air treatment system as claimed in claim 1, wherein the electrically evaluatable indicator signal is made available as a result of actuation of a pedal in a driver's cab of the commercial vehicle.

8. The air treatment system as claimed in claim 1, wherein the electrically evaluatable indicator signal is made available as a result of the fastening of a safety belt in a driver's cab of the commercial vehicle.

9. The air treatment system as claimed in claim 1, wherein the electrically evaluatable indicator signal is supplyable directly or indirectly to an electrical control via a data bus; and further wherein the electrically actuable valve is actuable by the electrical control.

10. The air treatment system as claimed in claim 1, further comprising:

a signal device provided in a driver's cab of the commercial vehicle, said signal device indicating that a minimum pressure for operating a service brake system of the commercial vehicle brake system is overshot; and wherein the compressed air outlet is supplied with compressed air when the minimum pressure for operating the service brake system is overshot and the indicator signal present.

11. The air treatment system as claimed in claim 10, wherein the signal device is a light utilized to indicate that the vehicle is being detained due to the parking brake system; and further wherein the light flashes when the minimum pressure is overshot and the parking brake is locked; and still further wherein the light is extinguished when a pressure threshold in the spring-loaded cylinder of the parking brake is overshot.

12. A method for controlling at least one spring-loaded cylinder of a parking brake of a commercial vehicle brake system, which commercial vehicle brake system is supplied with compressed air by an air treatment system, the air treatment system having a compressed air outlet supplied with compressed air via an overflow valve and coupled to the spring-loaded cylinder of the parking brake, the commercial vehicle brake system having an electrically actuable solenoid valve operatively coupled with the overflow valve, the method comprising the acts of:

monitoring for an electrically evaluatable indicator signal that is indicative of a driver being within the commercial vehicle;

shutting-off the overflow valve in at least one switching state of the electrically actuable solenoid valve when the electrically evaluatable indicator signal is absent in order to prevent ventilation of the spring-loaded cylinder due to a supply of compressed air to the compressed air outlet.

13. The method as claimed in claim 12, wherein the solenoid valve is a 3/2-way valve which, in a first switching state, ventilates a control inlet of the overflow valve and, in a second switching state, acts with pressure upon the control inlet of the overflow valve, whereby the overflow valve is shut off.

14. The method as claimed in claim 13, wherein the second switching state of the 3/2-way solenoid valve is brought about by application of a current to the 3/2-way solenoid valve.

15. The method as claimed in claim 12, wherein the solenoid valve is supplied centrally with compressed air.

16. The method as claimed in claim 12, wherein the solenoid valve is supplied with compressed air by at least one service brake circuit.

17. The method as claimed in claim 12, wherein the electrically evaluatable indicator signal is made available as a result of actuation of a pedal in a driver's cab of the commercial vehicle.

18. The method as claimed in claim 12, wherein the electrically evaluatable indicator signal is made available as a result of fastening of a safety belt in a driver's cab of the commercial vehicle.

19. The method as claimed in claim 12, wherein:

the electrically evaluatable indicator signal is supplied directly or indirectly to an electrical control via a data bus; and the electrically actuable solenoid valve is actuated by the electrical control.

20. The method as claimed in claim 12, wherein:

a signal device is provided in the driver's cab of the commercial vehicle, said signal device indicating that a minimum pressure for operating a service brake of the commercial vehicle brake system is overshot; and the compressed air outlet is supplied with compressed air when the minimum pressure for operating the service brake is overshot and the indicator signal is present.

21. The method as claimed in claim 20, wherein:

the signal device is a light utilized to indicate that the vehicle is being detained due to the parking brake system;

the light flashes when the minimum pressure is overshot and the parking brake is locked; and the light is extinguished when a pressure threshold in the spring-loaded cylinder of the parking brake is overshot.

22. A commercial vehicle having an air treatment system as claimed in claim 1.

* * * * *